United States Patent
Cho et al.

(10) Patent No.: US 9,623,865 B2
(45) Date of Patent: Apr. 18, 2017

(54) ENGINE STOP CONTROL METHOD OF POWER SPLIT-PARALLEL HEV SYSTEM

(71) Applicant: HYUNDAI MOTOR COMPANY, Seoul (KR)

(72) Inventors: Jin Kuk Cho, Goyang-si (KR); Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 1 day.

(21) Appl. No.: 14/872,092

(22) Filed: Sep. 30, 2015

(65) Prior Publication Data

US 2016/0144848 A1 May 26, 2016

(30) Foreign Application Priority Data

Nov. 25, 2014 (KR) ........................ 10-2014-0165004

(51) Int. Cl.
| | |
|---|---|
| *B60W 20/10* | (2016.01) |
| *B60W 10/06* | (2006.01) |
| *B60W 10/08* | (2006.01) |
| *B60W 20/20* | (2016.01) |

(52) U.S. Cl.
CPC ............ *B60W 20/10* (2013.01); *B60W 10/06* (2013.01); *B60W 10/08* (2013.01); *B60W 20/20* (2013.01); *B60W 2710/0644* (2013.01); *B60W 2710/083* (2013.01); *Y10S 903/93* (2013.01)

(58) Field of Classification Search
CPC .............................. B60W 20/10; B60W 10/06
See application file for complete search history.

(56) References Cited

U.S. PATENT DOCUMENTS

| | | | |
|---|---|---|---|
| 2009/0062062 A1* | 3/2009 | Choi ..................... | B60K 6/543 477/5 |
| 2012/0065827 A1* | 3/2012 | Kimura ............... | B60L 11/1811 701/22 |
| 2013/0210567 A1* | 8/2013 | Puiu ...................... | B60K 6/365 475/5 |

FOREIGN PATENT DOCUMENTS

| | | |
|---|---|---|
| JP | 2001-207885 A | 8/2001 |
| JP | 2001-233070 A | 8/2001 |
| JP | 2002-195070 A | 7/2002 |
| JP | 2009-143306 A | 7/2009 |
| JP | 2012-254688 A | 12/2012 |
| KR | 10-2009-0024914 A | 3/2009 |
| KR | 10-1054765 B1 | 8/2011 |
| KR | 10-1416422 B1 | 7/2014 |

* cited by examiner

Primary Examiner — Basil T Jos
(74) Attorney, Agent, or Firm — McDermott Will & Emery LLP

(57) ABSTRACT

An engine stop control method of a power split-parallel hybrid electric vehicle (HEV) system may include: determining any one driving mode among an EV mode, a power split mode and a parallel mode, corresponding to a driver's request; recognizing and deciding whether the driving mode is a mode required to stop an engine; stopping the engine; and performing kill torque (TQ) control on the revolution speed of the engine through a motor so that the revolution speed of the engine reaches 0 rpm. Accordingly, the revolution speed of the engine can be reduced down to an rpm lower than that of the conventional art, thereby promoting fast mode conversion.

3 Claims, 3 Drawing Sheets

ENGINE STOP CONTROL METHOD OF POWER SPLIT-PARALLEL HEV SYSTEM

CROSS-REFERENCE TO RELATED APPLICATION

This application claims priority under 35 U.S.C. §119(a) to and the benefit of Korean Patent Application No. 10-2014-0165004 filed on Nov. 25, 2014 with the Korean Intellectual Property Office, the entire contents of which are incorporated herein by reference.

TECHNICAL FIELD

The present disclosure relates to an engine stop control method of a power split-parallel hybrid electric vehicle (HEV) system, and more particularly, to an engine stop control method of a power split-parallel HEV system, which minimizes impact applied to a one-way clutch (OWC) when an engine is stopped, thereby improving drivability and durability.

BACKGROUND

A power split-parallel hybrid electric vehicle (HEV) system is a technique capable of realizing an EV mode, a power split mode, and an over drive (parallel) mode.

Meanwhile, a one-way clutch (OWC) mounted in a vehicle to prevent reverse revolutions of an engine is a device that enables revolutions in a forward direction predetermined in design without limit but restricts revolutions in a reverse direction. If the engine is to be reversely revolved with a strong force, the OWC may be damaged.

A conventional HEV performs control of suddenly reducing the revolution speed of an engine by using an electric motor when the engine is stopped, which is referred to as kill torque control.

This is because, if the engine is stopped due to its inertia, vibration is generated at a specific rpm, thereby providing a driver with an unpleasant feeling. Hence, the kill torque control should be improved.

As shown in FIG. 1, in the graph in which kill torque (TQ) control is performed by using HSG when an engine of an HEV is stopped, the HSG determines TQ to be output according to a revolution speed of the engine, and the TQ to be output is configured as map data through tests in the development of the vehicle.

That is, in engine stop control of the HEV, after the kill TQ control is performed up to a specific engine rpm by using the HSG, kill torque is then removed at the specific engine rpm, and the engine is stopped due to its inertia at the specific engine rpm or less.

Here, a motor that is a power source in the HEV is defined as MG1, and a generator in the HEV is defined as MG2.

However, mode conversion performed by an OWC is impossible in order to reduce the revolution speed down to a low rpm with kill TQ of the MG1, and therefore, the inertia of the engine cannot be offset at the time when the engine is stopped. For this reason, it is difficult to perform the kill TQ control down to the low rpm.

The kill TQ is removed at a high rpm by the OWC of the engine, but reverse revolutions of the engine cannot be thoroughly prevented through the control. Therefore, in a case where the engine has inertia by which the engine can be reversely revolved in a power split-parallel system, the OWC may be damaged due to a strong impact.

In addition, as impact occurs due to the damage of the OWC, the impact of the OWC, if not the impact caused by the inertia of the engine, is transmitted to a driver, which decreases the value of the vehicle.

SUMMARY OF THE DISCLOSURE

An embodiment of the present invention provides an engine stop control method of a power split-parallel hybrid electric vehicle (HEV) system, which minimizes impact applied to a one-way clutch (OWC) when an engine is stopped in an HEV, thereby improving drivability and durability.

In one aspect, an embodiment of the present invention provides an engine stop control method of a power split-parallel HEV system, the method including: determining any one driving mode among an EV mode, a power split mode and a parallel mode, corresponding to a driver's request; recognizing and deciding whether the driving mode is a mode required to stop an engine; upon determination that the driving mode is a mode required to stop an engine, stopping the engine and performing kill torque (TQ) control on the revolution speed of the engine through a motor until the revolution speed of the engine reaches 0 rpm.

In an exemplary embodiment, the performing of the kill TQ control may include: performing the kill TQ control through the motor; deciding whether the revolution speed of the engine reaches a specific rpm; outputting the TQ of the motor as a value obtained by offsetting friction TQ of the engine after the kill TQ is removed when the revolution speed of the engine reaches the specific rpm; and performing feedback control on the TQ of the motor, which offsets the friction TQ, until the revolution speed of the engine is converged to 0 rpm.

Other aspects and exemplary embodiments of the invention are discussed infra.

According to an embodiment of the present invention, the revolution speed of the engine can be reduced down to an rpm lower than that of the conventional art, thereby promoting fast mode conversion. In addition, the inertia of the engine can be offset at the time when the engine is stopped, so that it is possible to perform kill TQ control down to the rpm lower than that of the conventional art.

Further, the inertia of the engine can be reduced by generating the TQ that offsets the friction TQ. Thus, it is possible to reduce impact applied to an OWC, thereby improving the durability of the system. In addition, the control of reducing the inertia of the engine can not only reduce impact applied to the OWC but also allow a driver not to feel the impact, thereby improving the driver's satisfaction.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
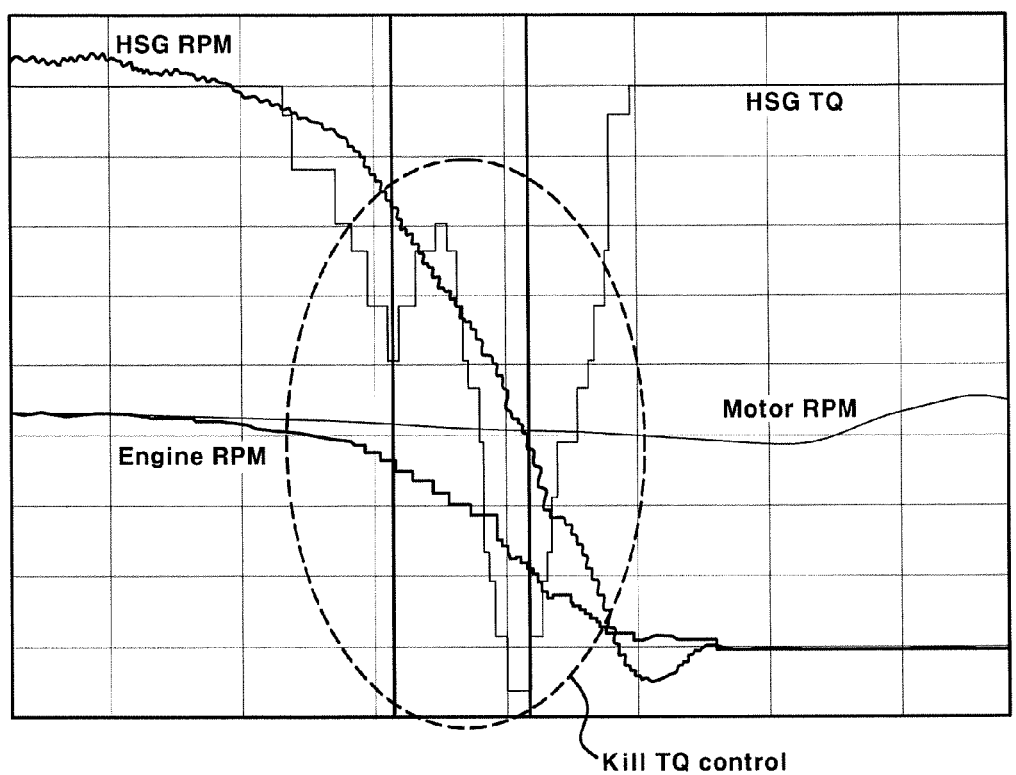
FIG. 1 is a graph in which kill torque (TQ) control is performed by using HSG when a conventional hybrid electric vehicle (HEV) is stopped.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
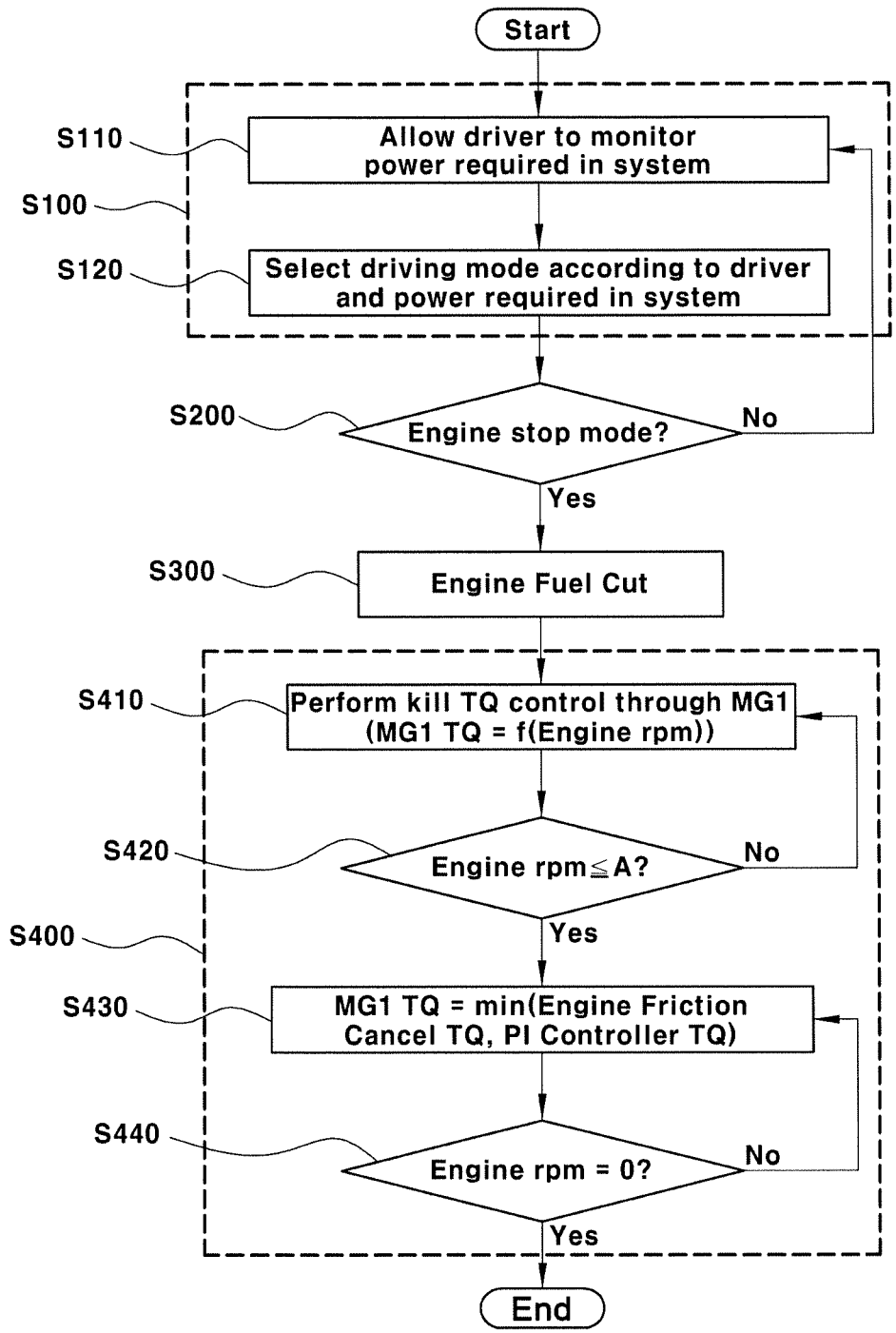
FIG. 2 is a flowchart illustrating an engine stop control method of a power split-parallel HEV system according to an embodiment of the present invention.
Figure 3:
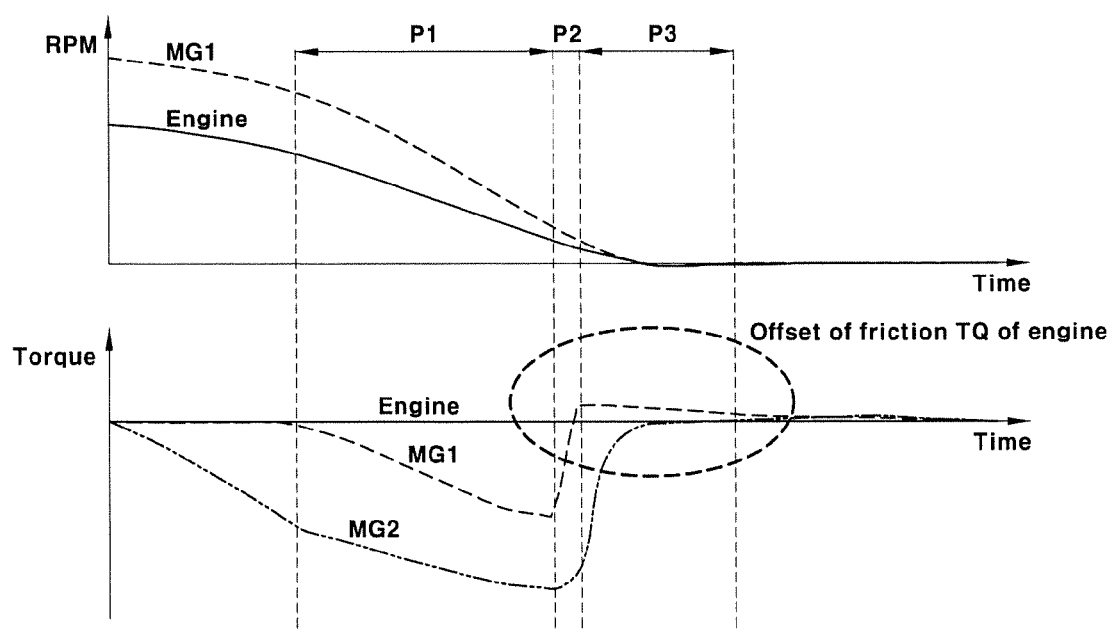
FIG. 3 shows kill TQ and rpm control graphs through the engine stop control method of the power split-parallel HEV system according to the embodiment of the present invention.

An engine stop control method of a power split-parallel hybrid electric vehicle (HEV) system according to an embodiment of the present invention, as shown in FIG. 2, is different from the conventional art in control for reducing impact applied to a one-way clutch (OWC). The engine stop control method is performed as follows with reference to FIGS. 2 and 3. FIG. 2 is a flowchart illustrating an engine stop control method of a power split-parallel HEV system according to an embodiment of the present invention. FIG. 3 shows kill TQ and rpm control graphs through the engine stop control method of the power split-parallel HEV system according to the embodiment of the present invention.

First, a driving mode among an EV mode, a power split mode and a parallel mode is determined corresponding to a driver's request (S100).

It is recognized and decided whether the driving mode is a mode required to stop an engine (S200).

After that, the engine is stopped. That is, the engine has been stopped when engine fuel is cut, but a crank is continuously rotated by a driving speed (S300).

Next, kill TQ control is performed on the revolution speed of the engine through a motor MG1 until the revolution speed of the engine reaches 0 rpm (S400).

A specific rpm is experimentally determined as a generator (MG2) performs reaction force control on the MG1 (MG2 TQ=reaction force TQ+demand TQ) while the kill TQ control is performed through the MG1. The specific rpm may be set to an rpm lower than the engine rpm of the conventional HEV.

In this state, in the performing of the kill TQ control (S400), the kill TQ control is performed through the MG1 (S410), thereby deciding whether the engine reaches the specific rpm, for example, a predetermined rpm A, or less (S420).

Thus, after the kill TQ is removed when the engine reaches the specific rpm, the TQ of the MG1 is output as a value that offsets friction TQ of the engine (S430).

The output TQ of the MG1 is a value obtained by considering a gear ratio, and increases with a constant slope from the kill TQ to the TQ obtained by offsetting the friction TQ.

Then, feedback control is performed on the TQ of the MG1, which offsets the friction TQ, until the revolution speed of the engine is converged to 0 rpm (S430 and S440).

Meanwhile, the determining of the driving mode (S100) includes allowing the driver to monitor power required in the system (S110); and selecting a driving mode according to the driver and the power required in the system (S120).

In a case where the driving mode is a mode not required to stop the engine in step S200, feedback to the allowing of the driver to monitor the power required in the system (S110) is performed.

According to the method described above, as shown in FIG. 3, control when the engine is stopped in a state in which a vehicle is stopped according to time can be identify through graphs.

In the graphs, P1 designates a section in which the kill TQ is controlled to reduce the revolution speed of the engine, P2 designates a section in which the TQ is changed with a constant slope up to the TQ obtained by offsetting the friction TQ after the kill TQ is removed, and P3 designates a section in which the reverse revolution of the engine is prevented by offsetting the friction TQ of the engine (feedback control is performed so that the revolution speed of the engine is converged to 0 rpm).

According to the present invention configured as described above, the revolution speed of the engine can be reduced down to an rpm lower than that of the conventional art, thereby promoting fast mode conversion. In addition, the inertia of the engine can be offset at the time when the engine is stopped, so that it is possible to perform kill TQ control down to the rpm lower than that of the conventional art.

Further, the inertia of the engine can be reduced by generating the TQ that offsets the friction TQ. Thus, it is possible to reduce impact applied to an OWC, thereby improving the durability of the system. In addition, the control of reducing the inertia of the engine can not only reduce impact applied to the OWC but also allow a driver not to feel the impact, thereby improving the driver's satisfaction.

The aforementioned method may be implemented by a controller including computer storage medium encoding computer executable instructions that when executed by one or more processors of the controller, cause the one or more processors to perform the steps of the aforementioned method. The controller may be integrated to an electronic control unit (ECU) or of the vehicle. The controller may include various signal lines for providing engine status such as the rmp of the engine, to the controller, and various control lines for transmitting control signals, such as kill TQ control signal and MG1 TQ signal, to the respective components of the vehicle, from the controller.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An engine stop control method of a power split-parallel hybrid electric vehicle (HEV) system, the method comprising steps of:

determining any one driving mode among an EV mode, a power split mode and a parallel mode, corresponding to a driver's request;

recognizing and determining whether the driving mode is a mode required to stop an engine; and upon determination that the driving mode is a mode required to stop an engine, stopping the engine and performing kill torque (TQ) control on a revolution speed of the engine through a motor until the revolution speed of the engine reaches 0 rpm, wherein the performing of the kill TQ control includes:

performing the kill TQ control through the motor;

determining whether the revolution speed of the engine reaches a specific rpm;

after removing the kill TQ when the revolution speed of the engine reaches the specific rpm, outputting the TQ of the motor as a value obtained by offsetting friction TQ of the engine; and performing feedback control on the TQ of the motor, which offsets the friction TQ, until the revolution speed of the engine is converged to 0 rpm.

2. The method of claim 1, wherein the step of determining the driving mode includes:

allowing the driver to monitor power required in the system; and selecting a driving mode according to the driver and the power required in the system.

3. The method of claim 2, further comprising a step of:

upon determination that the driving mode is a mode not required to stop the engine, repeating the step of allowing the driver to monitor the power required in the system.

* * * * *